United States Patent [19]

Robert et al.

[11] Patent Number: 5,719,910
[45] Date of Patent: Feb. 17, 1998

[54] INSTALLATION AND METHOD FOR THE JOINT STORAGE OF NUCLEAR FUEL ASSEMBLIES AND CONTROL BARS

[75] Inventors: Jean Robert, La Chapelle Sur Erdre; Bernard Kopecky, Nantes, both of France

[73] Assignee: A.T.E.A. Societe Atlantique de Techniques Avancees, Carquefou Cedex, France

[21] Appl. No.: 747,289

[22] Filed: Nov. 12, 1996

[30] Foreign Application Priority Data

Nov. 10, 1996 [FR] France .................. 95 13336

[51] Int. Cl.⁶ .................. G21C 19/06; G21C 19/07
[52] U.S. Cl. .................. 376/272
[58] Field of Search .................. 376/272, 260, 376/261; 976/DIG. 248, 506.1; 250/506.1, 507.1

[56] References Cited

U.S. PATENT DOCUMENTS

| | | | |
|---|---|---|---|
| 4,248,668 | 2/1981 | Dixon et al. | 376/272 |
| 4,400,344 | 8/1983 | Wachter et al. | 376/272 |
| 4,448,744 | 5/1984 | Karger et al. | 376/262 |
| 4,857,263 | 8/1989 | Machado et al. | 376/272 |
| 4,960,560 | 10/1990 | Machado et al. | 376/272 |
| 5,196,161 | 3/1993 | Lewis | 376/272 |
| 5,245,641 | 9/1993 | Machado et al. | 376/272 |
| 5,311,563 | 5/1994 | Schabert et al. | 376/272 |
| 5,361,281 | 11/1994 | Porowski | 376/272 |

FOREIGN PATENT DOCUMENTS

| | | | |
|---|---|---|---|
| 0 626 699 A1 | 11/1994 | European Pat. Off. | |
| 2 680 909 A1 | 3/1993 | France. | |
| 28 22 397 A1 | 9/1979 | Germany. | |
| 30 27 562 A1 | 2/1982 | Germany. | |
| 2730850 | 1/1979 | Japan | 376/272 |
| 08-136695 | 5/1996 | Japan | 376/272 |

*Primary Examiner*—Michael J. Carone
*Assistant Examiner*—M. J. Lattig
*Attorney, Agent, or Firm*—Pollock, Vande Sande & Priddy

[57] ABSTRACT

An installation, designed to stock both nuclear fuel assemblies of square section and control bars of cruciform shape taken from a boiling water nuclear reactor, comprises vertical housings of square section, each able to accommodate a control bar and four assemblies. The housings are formed in and between encasing tubes (22) which rest upon a lower plate (10). After placing a control bar in the housing, a removable unit (30) is inserted which comprises a baseplate (34) surrounding the tip of the bar, four holders (32) resting on this baseplate, and spacer wedges (36) separating the holders. One assembly is then placed in each holder (32).

12 Claims, 4 Drawing Sheets

5,719,910

INSTALLATION AND METHOD FOR THE JOINT STORAGE OF NUCLEAR FUEL ASSEMBLIES AND CONTROL BARS

FIELD OF THE INVENTION

The present invention mainly relates to a storage installation designed to receive both nuclear fuel assemblies and control bars after these assemblies and bars have been irradiated in a nuclear reactor.

The storage installation according to the invention is more particularly adapted to accommodate nuclear fuel assemblies of square section, and control bars which each comprise a base surmounted by an active part of cruciform shape. Such assemblies and such control bars are used in boiling water nuclear reactors.

The invention also relates to a storage method using said installation.

BACKGROUND OF THE INVENTION

When nuclear fuel assemblies are withdrawn from the core of nuclear reactors, it is customary to place them vertically in rack-shaped storage installations which themselves are placed in pools filled with water. The purpose of the storage of the assemblies in these installations is to allow them to lose sufficient activity so that they may be transported without risk to another site, for example for dismantling and subsequent reprocessing.

Existing storage installations are designed to receive as high a number of assemblies as is possible within a given volume, while nevertheless providing effective absorption of the neutrons which leak from these assemblies.

In practice, and as is illustrated in particular by U.S. Pat. No. 4,248,668, each nuclear fuel assembly is accommodated vertically in square section housing. More precisely, a storage installation is generally formed of an array of square section storage holders placed in a checkboard array and fixed substantially vertically to a lower horizontal plate resting on its feet on the bottom of the pool. The nuclear fuel assemblies are accommodated in the housings formed in and between the holders.

As is also illustrated by FR-A-2 680 909, it is known to add panels of neutrophage material, which have strong neutron absorption properties, to the walls of the holders. The addition of these panels reduces the distances between the assemblies accommodated in the housings, without any risk of starting a chain reaction.

When the control bars which drive the nuclear reactors are replaced, the spent bars must also be stored for a certain length of time in the pool on site before being transferred to another site.

In pressurized water nuclear reactors the control bars are in the form of clusters of absorbent rods which are inserted from the top through guide tubes provided for this purpose in the assemblies. Consequently, these clusters can be inserted without any special difficulty into the assemblies previously placed in the storage installation.

On the other hand, in boiling water nuclear reactors, the control bars generally have a lower tip for handling purposes and an active part of cruciform shape which is intended to be inserted from the bottom into the spaces formed between four adjacent assemblies. In consequence, it is entirely impossible to insert these control bars between the nuclear fuel assemblies from above if the latter have been placed in the housings of an existing storage installation. In boiling water nuclear reactors, irradiated control bars must therefore be stored separate from the assemblies in separate storage installations. This leads to a considerable loss of space on the reactor site.

SUMMARY OF THE INVENTION

The object of the invention is a storage installation designed to accommodate both nuclear fuel assemblies and the control bars from a boiling water nuclear reactor in order to achieve considerable saving of space on the site of the reactor.

According to the invention, this result is achieved by means of a joint storage installation for square section nuclear fuel assemblies and control bars which each comprise a tip surmounted by an active part of cruciform shape, and the installation comprises:

a substantially horizontal lower plate;

encasing tubes, of square section, arranged in a checkboard array and fixed substantially vertically to the lower plate, in such manner that they form housings in and between the encasing tubes that are each able to accommodate a control bar supported by its tip on the lower plate;

removable storage holders, of square section, able to be mounted in groups of four in each of the housings around the active part of a control bar, each holder comprising a bottom able to support a nuclear fuel assembly; and baseplates positioned between the lower plate and each group of four holders in such manner that the distance between the bottoms of these holders and the lower plate is substantially equivalent to the height of the tip of a control bar.

In a preferred embodiment of the invention, wedges are positioned between the four holders inserted in the same housing so that these holders are kept separate one from another and from the control bar.

Preferably, each group of four holders subsequently forms part of a removable group unit which comprises in addition one of the baseplates and the above-mentioned wedges.

The baseplate of each removable unit therefore advantageously has the shape of a tubular element that is substantially vertical and whose square section is slightly smaller than that of the encasing tubes. The dimensions of this tubular element are chosen so that they allow the removable unit to rest on the lower plate of the installation and surround the tip of the control bar which is normally previously mounted in the corresponding housing.

The lower plate of the storage installation preferably comprises feet of adjustable height which project downwards to enable this plate to rest on the bottom of the pool filled with water.

In order to close the housings formed between the encasing tubes at the periphery of the installation, the latter also comprises at least one enclosure plate able to restrain the removable storage holders.

To provide for safe storage in minimum space, each storage holder preferably comprises an inner cladding in neutrophage material.

In a preferred embodiment of the invention, the encasing tubes are interconnected by spacer clamps which have support surfaces facing the housings formed between the encasing tubes. These support surfaces serve to maintain the holders, inserted in these latter housings, separate from the encasing tubes.

A further object of the invention is a method of storing nuclear fuel assemblies of square section jointly with control bars which each comprise a tip surmounted by an active part of cruciform shape, in a storage installation having substantially vertical housings of square section.

This method comprises the following steps:

insertion of a control bar in each of the housings;

positioning of a group of four removable storage holders in each of the housings around the active part of the control bar; and insertion of a nuclear fuel assembly in each of the holders.

The positioning of a group of four holders is advantageously carried out by introducing into the housing a removable unit which comprises the four holders, spacer wedges placed between the holders and a collar base placed under the holders in the bottom of the housing and around the tip of the control bar.

BRIEF DESCRIPTION OF THE DRAWINGS

By way of example, a preferred embodiment of the invention will now be described with reference to the appended drawings, in which.

DESCRIPTION OF PREFERRED EMBODIMENT

Figure 1:
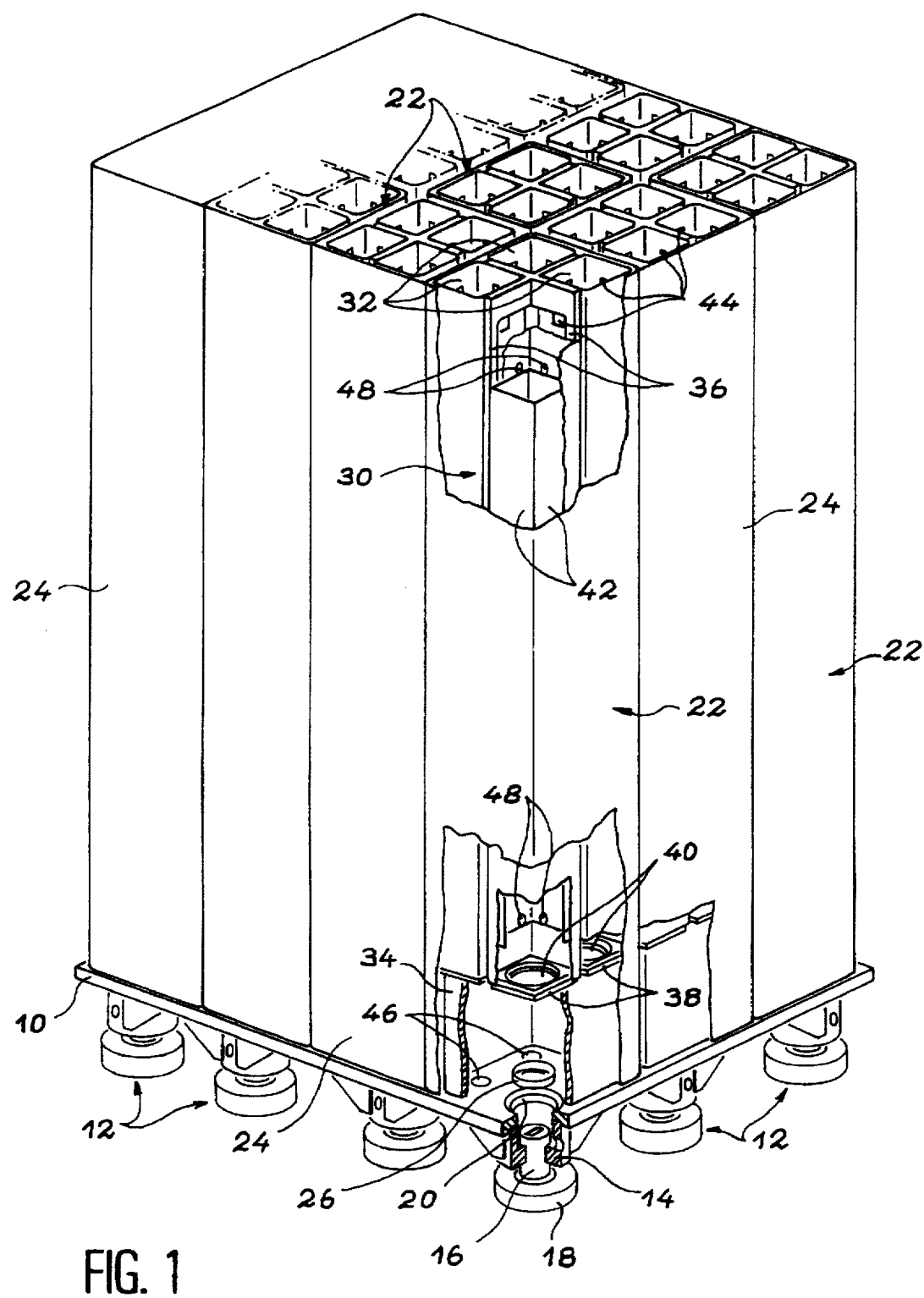
FIG. 1 is a perspective view with insets representing an assembly and control bar storage installation according to the invention.

FIG. 1 shows, a storage installation according to the invention which can store forty-eight nuclear fuel assemblies from a boiling water nuclear reactor together with twelve control bars previously used in the same reactor. Such installation is designed to be placed in a pool filled with water, either alone or with identical storage installations or installations of a different size, to allow the assemblies and control bars to be subsequently transferred to another site without risk.

It can be easily understood that it is possible to give the storage installation according to the invention different dimensions so that it can receive a larger or smaller number of assemblies and control bars while remaining within the limits of the invention. Whatever its dimensions, the installation's layout is such that the number of nuclear fuel assemblies it is likely to store is four times higher than the number of control bars it may receive.

Figure 2:
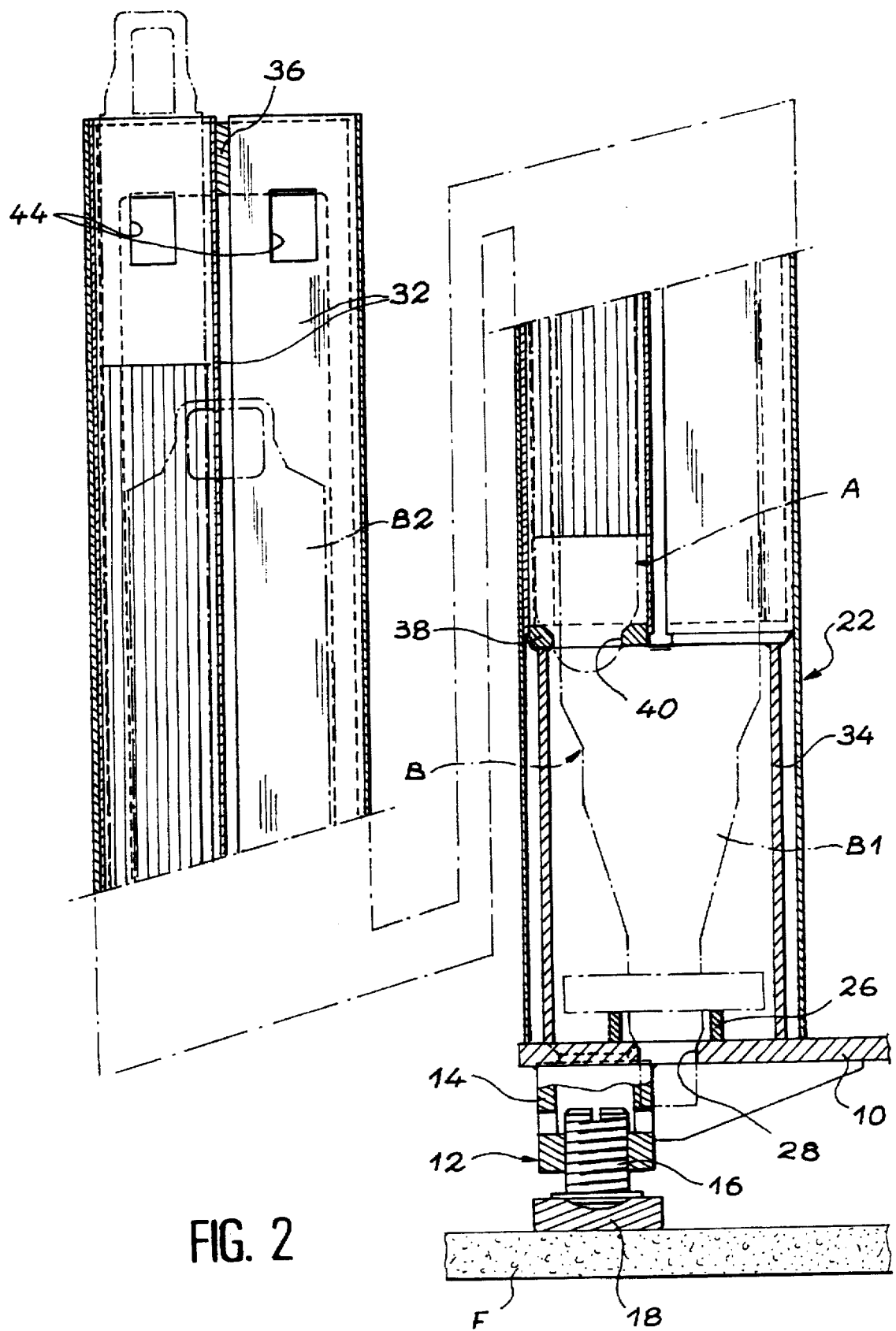
FIG. 2 is a vertical section view showing in more detail one of the encasing tubes and the structure it contains, a control bar and a nuclear fuel assembly being represented by a chain-dotted line.

Prior to proceeding with a description of the storage installation of the invention, it is noted that the nuclear fuel assemblies which equip boiling water nuclear reactors are square section assemblies of which one, given the reference letter A, is shown chain-dotted lines in FIG. 2.

Figure 3:
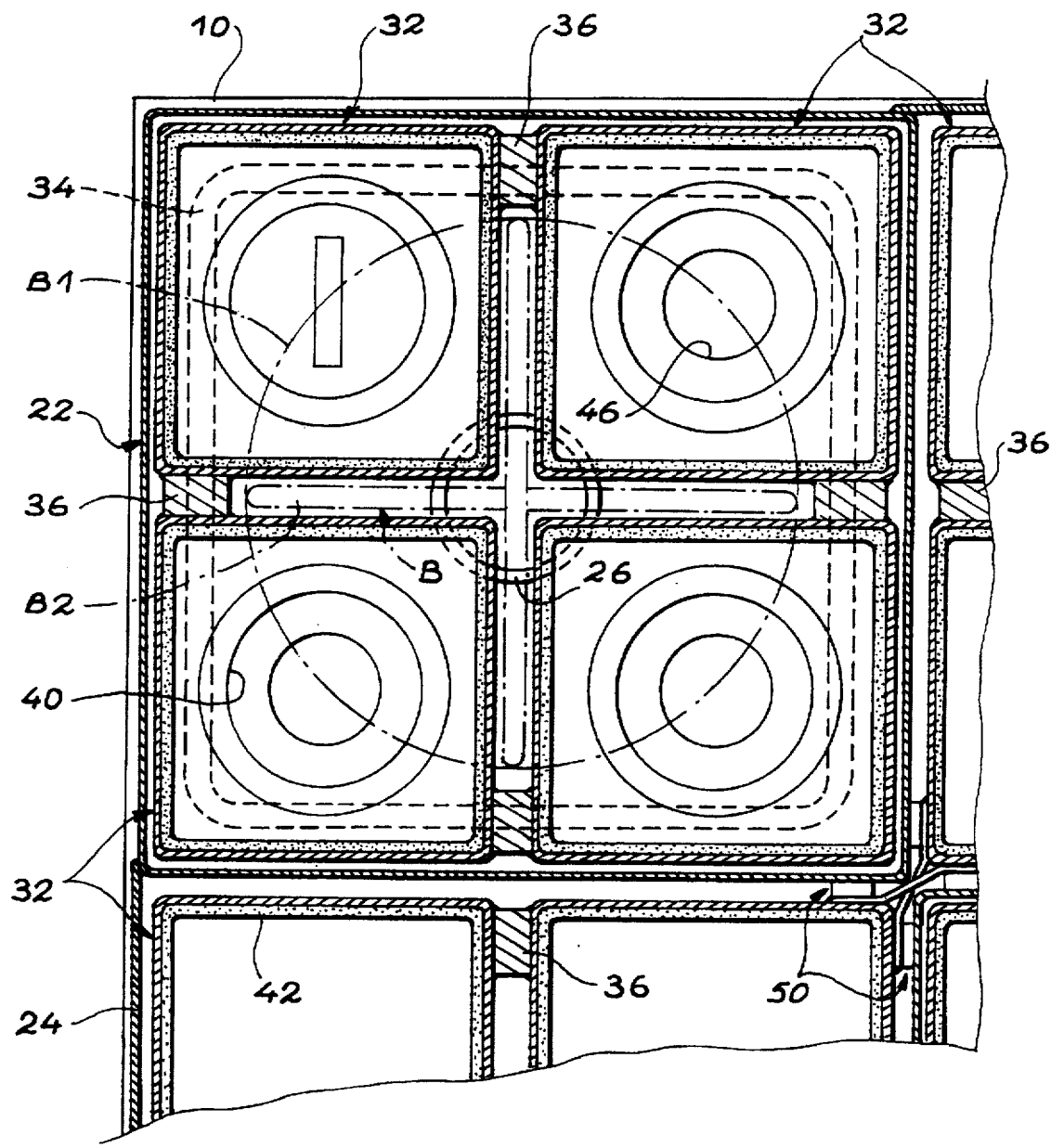
FIG. 3 is a top plan view part of the installation.

As also represented by chain-dotted lines in FIGS. 2 and 3 under the reference letter B, the control bars which are associated with these assemblies A in boiling water nuclear reactors each comprise a tip B1 surmounted by an active part B2 of cruciform shape. More precisely, a control bar B is normally associated, in the core of the reactor, with four A assemblies, in such manner that tip B1 of the control bar is placed under the assemblies so that the reactor can be driven from below and so that active part B2 of the control bar is inserted between four adjacent A assemblies. Therefore, active part B2 of each control bar B extend upward over a distance that is approximately equal to the height of the active part of assemblies A, and forms four right-angled fins which fit into the spaces formed between the assemblies.

As is well illustrated by FIGS. 1 to 3, the storage installation according to the invention comprises a 10, is substantially horizontal plate 10 intended to rest on the bottom F (FIG. 2) of a pool by means of feet 12 of adjustable height. These feet 12 are designed to be adjustable so that each one is able to transfer to the bottom F of the pool a substantially equal fraction of the load supported by lower plate 10, despite defects which may exist on the bottom of the pool. Thus, the level of lower plate 10 can also be adjusted so that its upper surface is horizontal.

In practice, and as shown in particular by FIGS. 1 and 2, each of the feet 12 can be adjusted using an upper part 14 of hollow cylindrical form, with a vertical axis, fixed under the lower surface of plate 10, and using a lower part 16 screwed into upper part 14 in line with its axis. Lower part 16 is fitted with a support shoe 18 at its lower end. A hole 20 is cut in plate 10, along the vertical axis of each of the feet 12, so that upper part 16 can be screwed and unscrewed from above plate 10 using an appropriate tool.

The storage installation represented in the drawings also comprises a certain number of encasing tubes 22, of square section, positioned in checker board array and fixed substantially vertically onto lower plate 10, e.g., by welding.

Owing to this layout, vertical housings of substantially equivalent size are formed above plate 10 both within each of the encasing tubes 22 and between adjacent encasing tubes. As will be seen below, the height and section of each of the housings thus formed are such that they can accommodate both one control bar B and four nuclear fuel assemblies A previously withdrawn from the boiling water nuclear reactor.

So that the housings formed between encasing tubes 22 at the periphery of the installation may be closed on the outside, a vertical enclosure plate 24 is fixed to lower plate 10 and to encasing tubes 22, for example by welding, at least opposite each of the housings to be closed. As a variant, these peripheral enclosure plates 24 may be replaced by a single vertical enclosure plate encircling the entire installation.

As mentioned above, each of the housings formed in each of the encasing tubes 22 and between these tubes is intended to accommodate a control bar B. For this purpose, lower plate 10 of the installation, on its upper surface and in the center of each of the above-mentioned housings, is equipped with a receptacle made up of a sleeve 26 of low height and a hole 28 which passes through plate 10 along the same vertical axis.

The storage installation of the invention also comprises removable group units intended to be inserted into each of the housings formed inside encasing tubes 22 and between these tubes, after a control bar B has been accommodated in this housing.

Each of the removable group units, generally given reference number 30 in FIG. 1, comprises four storage holders 32, a baseplate 34 and spacer wedges 36.

More precisely, each of the storage holders 32 has a square section and is large enough to receive one nuclear fuel assembly A. Each holder 32 comprises a bottom 38 with a hole 40 pierced in its center designed to accommodate and support the foot of the assembly. In addition, at least over part of their height intended to hold the central part of assembly A containing the nuclear fuel, each of holders 32 has an inner cladding 42 in neutrophage material. This inner cladding 42 may in particular be in the form of flat panels whose edges overlap as shown in FIG. 1. An embodiment of these panels is described in FR-A-2 709 995.

Baseplate 34 is in the form of a square section tube whose sides are slightly shorter than those of the square section of each encasing tube 22. The four removable storage holders 32 of removable group unit 30 rest upon and are fixed side by side, for example by welding, to one end of baseplate 34. More precisely, when unit 30 is inserted into one of the housings formed in and between encasing tubes 22, baseplate 34 rests on lower plate 10 and surrounds tip B1 of control bar B previously inserted into this housing. Bottoms 40 of storage holders 32 are therefore distanced from lower plate 10 so that the holders come to be positioned around active part B2 of the control bar, on either side of the fins formed by this active part.

Spacer wedges 36 are formed of plates placed in between holders 32 and on which these holders are welded. These wedges form an upper space between holders 32 which is greater than the thickness of the fins of active part B2 of control bar B (FIG. 3). The plates forming wedges 36 extend upward beyond the upper end of control bar B and they are connected to one another at this level, for example by welding, to form a cross-shaped section (FIGS. 1 and 2). Below this upper part, the plates which form wedges 36 have their central part hollowed out so that active part B2 of control bar B can be accommodated between holders 32.

For handling of removable unit 30, windows 44 are cut in the upper parts of the walls of holders 32.

As a variant, it is to be noted that holders 32, baseplate 34 and wedges 36 may form elements that are unconnected to one another, designed to be assembled and dismounted separately.

To facilitate the circulation of water inside the installation, with a view to improving effective cooling of the assemblies and control bars, openings such as those illustrated by 46 and 48 in FIG. 1 are respectively cut in lower plate 10 and in the side panels of holders 32 in the top and bottom parts of these holders not fitted with inner cladding 42.

Figure 4:
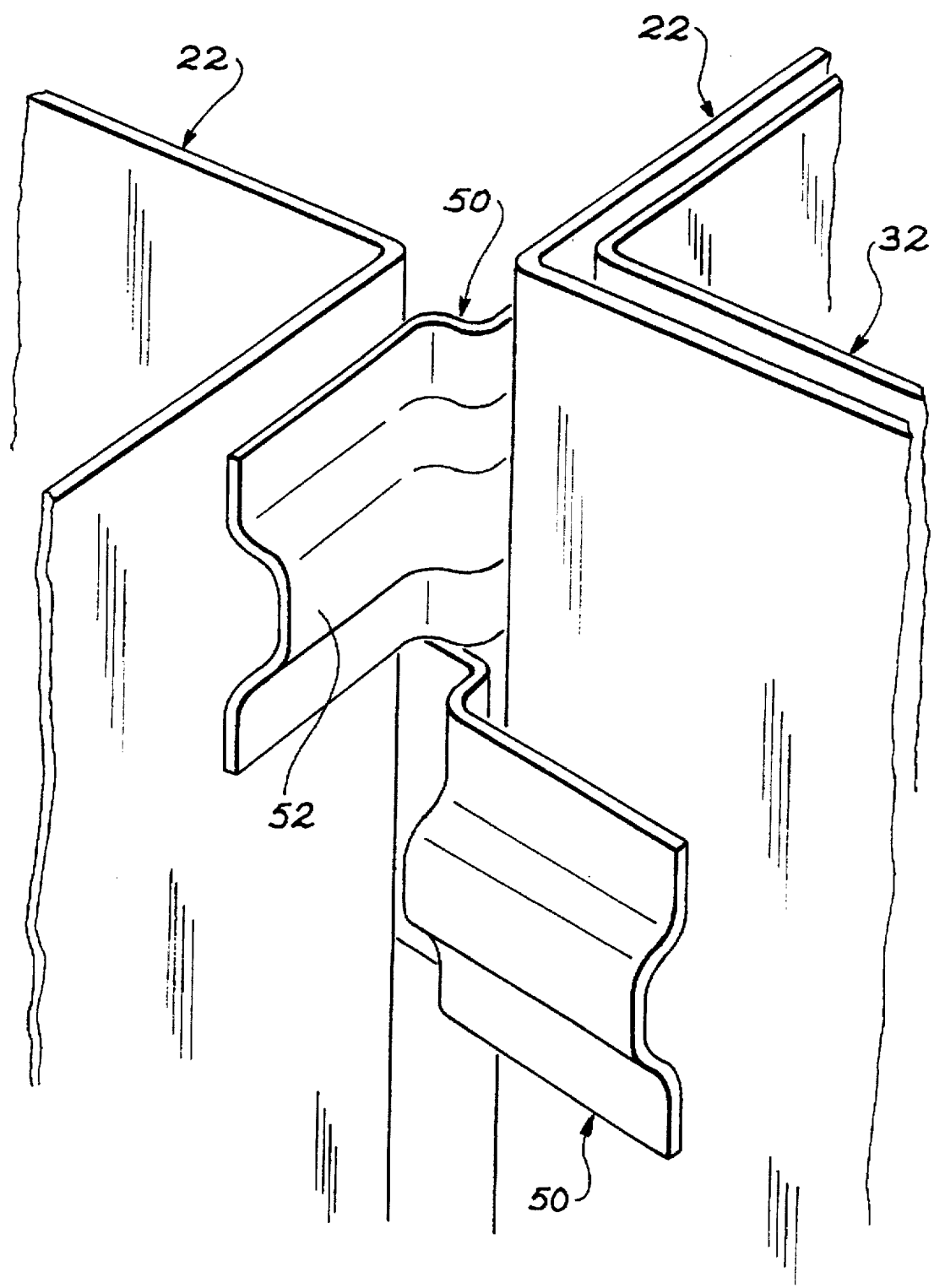
FIG. 4 is a view in perspective showing on a larger scale two spacer clamps whose corners connect together two adjacent encasing tubes of the installation.

As illustrated in particular in FIG. 4, encasing tubes 22 are interconnected at different levels by spacer clamps 50. More precisely, these spacer clamps 50 are welded to the outer parallel surfaces of encasing tubes 22 to form approximately a cross pattern as seen from above. Also, each of spacer clamps 50 comprises protruding parts 52 facing the housings formed between tubes 22. These protruding parts 52 form support surfaces against which come to abut holders 32, inserted into these housings when removable units 30 are received therein. In this manner, holders 32 are distanced from encasing tubes 22, and water breakers are formed between these components when the installation is placed in the pool filled with water. Together with wedges 36 and openings 46 and 48 previously described, the spacer clamps 50 therefore contribute to efficient cooling of the assemblies and control bars.

If assemblies A of nuclear fuel and control bars B are to be stored on the site of a boiling water nuclear reactor, removable group units 30 are withdrawn singly from their housings and control bars B are inserted into these housings in such manner that their tips B1 rest upon baseplates 26. Removable unit 30 is then placed in position so that it covers each of control bars B. The final operation consists of inserting an assembly A in each of holders 32 of removable units 30. The foot of each assembly therefore rests upon bottom 38 of the corresponding holder, opening 40 ensuring that it is well centered.

Evidently, the installation can be filled gradually, and if need be not fully. It is also possible to insert removable group units 30 into the housings formed in and between encasing tubes 22 without previously placing control bars in these housings when it is required to store assemblies not accompanied by control bars. Conversely, the installation of the invention may serve for storing control bars without it being necessary to simultaneously store fuel assemblies. Also, it is possible to store other items (guide tubes, sealed metal holders . . . ) in the installation instead of the removable group units.

We claim:

1. An installation for joint storage of nuclear fuel assemblies of square form, and of control bars which each comprise a tip surmounted by a cruciform active part, said installation comprising:

(a) a substantially horizontal lower plate;
   (b) encasing tubes, of square section, positioned in a checkerboard array and fixed substantially vertically onto the lower plate so as to form, in and between the encasing tubes, housings each adapted to accommodate a control bar resting on its tip on the lower plate;
   (c) removable storage holders, of square section adapted to be mounted in groups of four in each of the housings around the active part of a control bar, each holder comprising a bottom able to support an assembly of nuclear fuel; and
   (d) baseplates positioned between the lower plate and each group of four holders in such manner that the bottoms of said holders are separated from the lower plate over a distance that is appreciably equivalent to the height of the tip of a control bar.

2. The installation according to claim 1, in which the lower plate comprises feet of adjustable height which project downwards.

3. The installation according to claim 1, comprising in addition at least one substantially vertical enclosure plate closing the housings formed between the encasing tubes.

4. The installation according to claim 1, in which each of the storage holders comprises an inner cladding in neutrophage material.

5. The installation according to claim 1, in which the encasing tubes are interconnected by spacer clamps which comprise support surfaces oriented towards the housings formed between the encasing tubes, so that the holders accommodated in these latter housings are maintained distant from the encasing tubes.

6. The installation according to claim 1, including wedges positioned between the four holders accomodated in a same housing, so that these holders are separated one from one another and from the control bar.

7. The installation according to claim 6, in which each group of four holders is part of a removable group unit comprising in addition one of said baseplates and said wedges.

8. The installation according to claim 7 in which the baseplate of each removable unit is a substantially vertical tubular element whose square section is slightly smaller than that of the encasing tubes.

9. The installation according to claim 1, in which an upper part of each of the holders comprises a means of prehension.

10. The installation according to claim 1, in which the lower plate and the side panels of the holders comprise openings.

11. A method for joint storage of nuclear fuel assemblies of square section, and control bars which each comprise a tip surmounted by an active part of cruciform shape in a storage installation providing substantially vertical housings, of square section, said method comprising the steps of (a) inserting a control bar in each of the housings;

(b) positioning a group of four removable storage holders in each of the housings, around an active part of the control bar; and (c) inserting a nuclear fuel assembly in each of the holders.

12. The method according to claim 11, in which a group of four holders is positioned by inserting into the housing a removable unit comprising the four holders, spacer wedges positioned between the holders and a baseplate placed under the holders, in the bottom of the housing and around the tip of the control bar.

* * * * *